March 20, 1934.  A. OXAAL  1,951,435
METHOD OF AND APPARATUS FOR TESTING ELECTRICAL CONDUCTORS
Filed Aug. 24, 1929
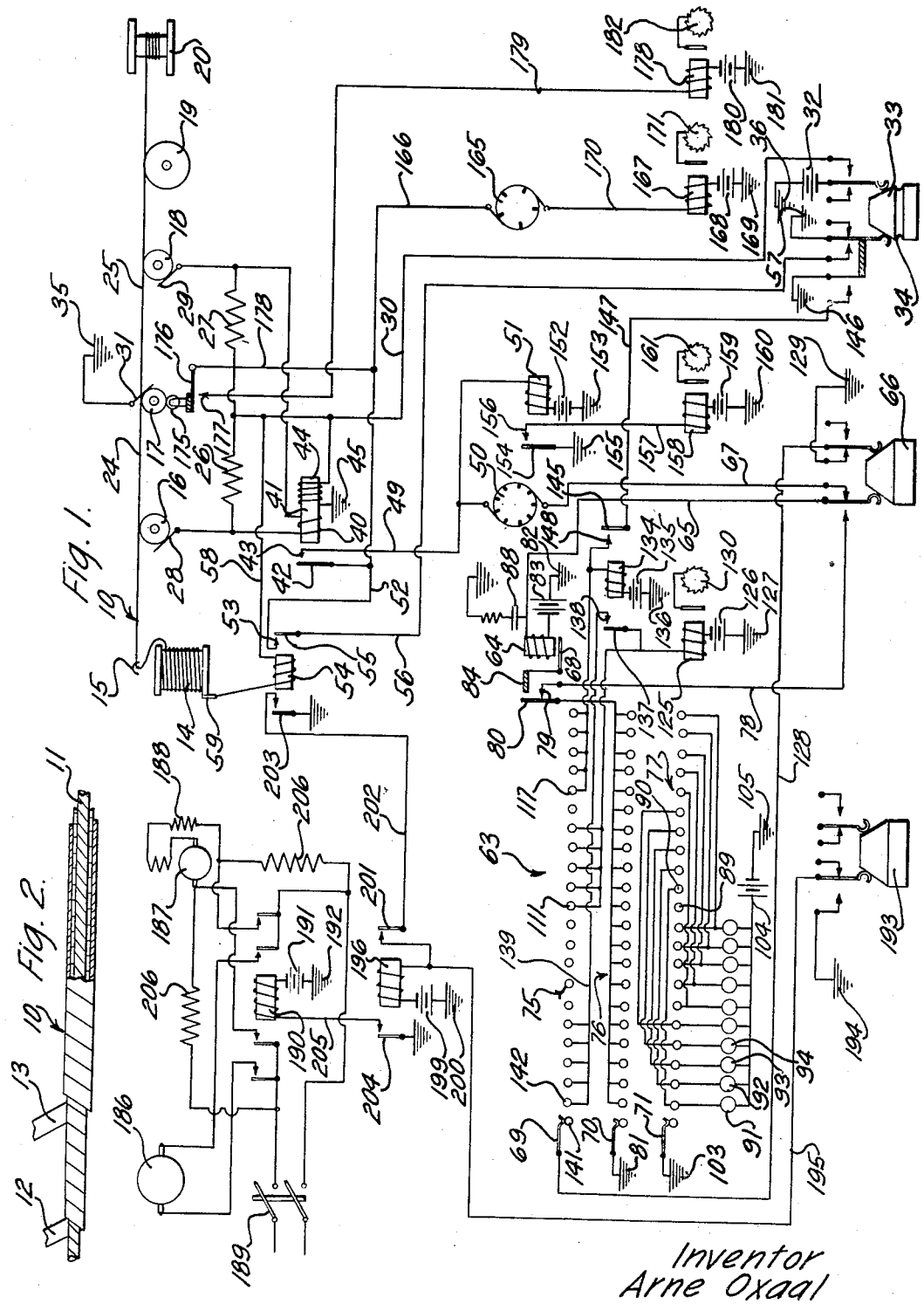
Inventor
Arne Oxaal
By H. O. Pattison Att'y.

Patented Mar. 20, 1934

1,951,435

UNITED STATES PATENT OFFICE 1,951,435

METHOD OF AND APPARATUS FOR TESTING ELECTRICAL CONDUCTORS

Arne Oxaal, Chicago, Ill., assignor to Western Electric Company, Incorporated, New York, N. Y., a corporation of New York Application August 24, 1929, Serial No. 388,127

8 Claims. (Cl. 175—183)

This invention relates to a method of and apparatus for testing an electrical conductor, and more particularly a composite electrical conductor.

An object of this invention is to provide a simple and inexpensive method of and apparatus for efficiently and expeditiously testing an electrical conductor.

In its preferred form, the invention contemplates the provision of a method and apparatus for testing a composite electrical conductor, such as a double tinsel ribbon thread of the type employed in telephone cord conductors. The conductor is passed over equi-distantly spaced electrical contact pulleys which constantly define ever changing portions of the conductor of equal predetermined lengths. The contact pulleys are connected in a Wheatstone bridge circuit in such a manner that the defined portions of the conductor form two bridge arms of equal lengths, the other two arms of the bridge being formed by two equal, fixed resistances. A relay connected across the bridge in place of the usual galvanometer operates a message register to record the number of portions of the conductor having only a single tinsel ribbon, the total length of such portions being simultaneously recorded on another register operated by a selector which is also controlled by the bridge relay. Means is provided for simultaneously operating suitable registers for recording the length of conductor tested and the number of knots, kinks, or other surface obstructions appearing in the tinsel ribbons. Means is also provided for discontinuing the advancement of the conductor when a complete interruption or absence of both of the tinsel ribbon occurs.

A clear understanding of the invention will be had from the following description of one specific embodiment thereof when taken in connection with the accompanying drawing in which Fig. 1 illustrates, diagrammatically, an apparatus embodying the features of the invention and by means of which the improved method may be practiced, and Fig. 2 is an enlarged detailed view, partly in section, of a portion of a composite conductor which may be tested by the improved method and apparatus.

Referring now to the drawing in which like numerals designate similar parts in the figures, there is disclosed a conductor or tinsel covered thread 10 which it is desired to test for defective portions. The conductor 10 may consist of composite parts such as a cotton thread core 11, and two ribbons 12 and 13 of tinsel spirally wrapped around the core 11 for conducting electricity along the conductor. In the manufacture of the conductor 10, it sometimes happens that one of the tinsels 12 or 13 may be interrupted or missing for some length, or the individual tinsels or the conductor may become knotted or kinked, and it is the purpose of this invention to test for such defects so that they may be rectified before the conductor is placed in service.

The conductor 10 is drawn from the top end of a stationary supply reel 14 thereof, through a guide 15 and around and across three equally spaced metallic contact pulleys 16, 17, and 18, by a capstan 19, and is wound upon a take-up reel 20. The capstan 19 and the take-up reel 20 are driven in a manner described later. The equal length portions 24 and 25 of the conductor 10 defined by the contact pulleys 16, 17, and 18, form two similar, ever-changing arms of a Wheatstone bridge circuit, which is completed by two equal, fixed resistances 26 and 27 which are joined to the pulleys 16 and 18 by means of brushes 28 and 29, respectively. This Wheatstone bridge, consisting of the fixed arms 26 and 27, and the ever-changing equal length portions 24 and 25 of the conductor 10, forming variable arms thereof, is supplied with current at a point mid-way between the fixed resistances 26 and 27 by a conductor 30 and has an opposite, current exit in a brush 31, which makes contact with the pulley 17.

The bridge supply conductor 30 receives current from a battery 32 with which it may be connected by actuating a push button switch 33, the switch having an annular groove 34 for retaining or locking it in an actuated position. The brush 31 is grounded at 35 and the battery 32 is grounded at 36, so that the current supplied the bridge by the conductor 30 returns through the ground. A winding 40 of a relay 41 is connected across the bridge in place of the usual galvanometer for detecting an unbalance in the bridge due to the fact that some length of one of the tinsel ribbons 12 or 13 of the conductor 10 is missing in the conductor portion passing through the bridge. When such a defective single tinsel ribbon portion enters the arm 24, the bridge becoming unbalanced sends current through the winding 40 which attracts an armature 42 into engagement with a contact member 43, thereby actuating certain recording registers to be described later.

When this defective conductor portion has passed from the arm 24 into the arm 25, the bridge will send current through the winding 40 in the reverse direction, allowing the armature 42 to retract and to become disengaged from the contact member 43. When one of the tinsel ribbons 12 or 13 is missing for a distance equal to or greater than the distance across both arms 24 and 25, the winding 40 will first attract the armature 42 when the defect enters the arm 24, but will a moment later when the defect extends across both arms 24 and 25 carry no current and cause no attraction on the armature 42 because the arms 24 and 25 will be similar and balanced, and it is obvious that the winding 40 would allow the armature 42 to become retracted in such a case. In order to overcome this difficulty a permanently energized winding 44 connected to the bridge supply conductor 30 and grounded at 45 is provided in the relay 41 to hold the armature 42 attracted in such a case, once it has been attracted by the winding 40. Thus, the winding 44 holds the armature 42 attracted in the case of long defects, but it will be noted that the winding 44 does not hold the armature attracted when the defect is short and extends only across one arm or into only a portion of the second arm 25, because then a reverse current flows through the winding 40 to repel the effect of the winding 44 to allow the armature 42 to become retracted. Thus from the above description it will be understood that the winding 40 operates the armature 42 for conductor defects in which a tinsel ribbon is missing for a short distance and that the winding 44 aids the winding 40 in case of long defects extending across both arms 24 and 25 to hold the armature 42 down after the winding 40 has attracted it.

The contact member 43 is connected by a conductor 49 to a current interrupter 50 which is rotated by suitable driving means connected with the capstan 19, and the conductor 49 also leads to the winding of a relay 51. The armature 42 is connected by a conductor 52 through a contact member 53 and an armature 55, normally held in engagement therewith during the test by a relay 54, to be described following, with a conductor 56 which is grounded at 57 during the test by the push button switch 33 being actuated. Thus the armature 42 through connection with the conductor 52 is designed to ground the contact member 43 and thus the interrupter 50 and relay 51 each time a single tinsel ribbon portion of the conductor 10 enters the bridge and unbalances it and causes attraction of the armature 42. The effect of this grounding on the interrupter 50 and the relay 51 will be described later. The relay 54 is supplied with current by a conductor 58 connected to the bridge supply conductor 30 and clamped at 59 to the supply reel 14, this relay circuit returning to the bridge through the supply reel 14, which is composed of metal, and the conductor 10. With this construction when both tinsel ribbons 12 and 13 in the conductor 10 happen to be missing the relay 54 is deenergized to allow the retraction of the armature 55 to cause the disconnection of the ground afforded the interrupter 50 and relay 51 by the conductor 56 in the event of such a completely defective conductor.

The current interrupter 50 is connected to a selector 63 of any suitable type such as is commonly used in telephone circuits, and this selector will not be described in detail. The selector 63 includes a relay 64 the winding of which is connected by a conductor 65 through a push button switch 66 with a conductor 67 which connects with the interrupter 50. The push button switch 66 is normally not actuated so that ordinarily the conductors 65 and 67 are connected together, but the purpose of the switch 66 will appear shortly. The relay 64 is provided with the familiar normally retracted armature 68, but this particular armature 68 actuates, through suitable means (not shown) three brushes 69, 70, and 71 for simultaneously making successive endless contact with three rows 75, 76, and 77, respectively, of contact members shown extending in a horizontal direction for the purpose of convenience, but actually disposed in a circular direction. The brushes 69, 70, and 71 are moved to the blank contact position shown in the drawing by actuating the switch 66 which causes the conductor 65 to connect with a conductor 78 which terminates in a contact member 79 making engagement with a resilient vibratory member 80 which is normally in engagement with the contact member 79, the vibratory member 80 being connected in common with all of the contact members of the central row 76 except the blank contact member with which the brush 70 is shown making contact. When the button 66 is thus actuated the brush 70, which at the time may happen to be making contact with any one of the commonly connected contact members of the central row 76, grounds the relay 64 through a ground connection 81 connected with the brush 70, since the relay 64 is also grounded at 82, and this grounding completes a circuit supplied by a battery 83 connected to the winding of the relay 64 to energize the relay and attract the armature 68 thereof.

As the armature is thus attracted it moves the brushes 69, 70, and 71 ahead one step to advance the brushes one contact in their respective rows 75, 76, 77. At this time an L-shaped oscillatory lever 84 secured to the armature 68 forces the vibratory member 80 out of engagement with the contact member 79, thus deenergizing the relay 64 and allowing the armature 68 to momentarily retract, when the contact made by the brush 70 with the contact member to which it has been advanced will again cause the armature 68 to be attracted by the relay 64 and advance the brushes 69, 70, and 71 another contact. The grounded brush 70, due to the actuated switch 66, will thus obviously actuate the relay 64 until the armature 68 has moved the brushes 69, 70, and 71 to the blank contact position shown in the drawing, from which position it is necessary for these brushes to start in testing the conductor 10 in order that the register and lamps actuated by the selector, and to be described later, will begin recording at the proper position.

The remaining structure of the selector 63 consists of recording apparatus for registering the length of the single tinsel ribbon conductor 10 passed through the bridge. When the armature 42 of the bridge relay is attracted due to the single tinsel ribbon conductor passing through the bridge the interrupter 50 is grounded through connection with the conductor 56, in the manner aforedescribed, and the relay 64, being supplied with the battery 83 which is grounded at 82, is thereby interruptedly grounded and energized to actuate the armature 68 thereof and the brushes 69, 70, and 71 to continuously move these brushes across their contact members as long as the bridge relay armature 42 remains attracted due to single tinsel ribbon conductor. In order to prevent sparking at the interrupter 50, a spark quencher 88, consisting of a grounded resistance and capacitance, is connected in the interrupter circuit. As the brushes 69, 70, and 71 are thus moved across their contact members 75, 76, and 77 under the control of the attracted armature 42 and due to the interrupted ground connection furnished by the interrupter 50, the brush 71 will illuminate successive lamps 92, 93, and 94, etc., due to the fact that the brush 71 is grounded at 103 and because the lamps are supplied with current from a battery 104 which is grounded at 105, and these lamps will indicate that 1, 2, 3, 4, etc., feet, respectively, of single tinsel ribbon conductor 10 have passed through the bridge, there being 10 of these lamps to read successively up to 10 feet. When the brush 69 is advanced to contact member 111 the brush 69 will make contact with 5 successive contact members connected in common (for the purpose of sufficient contact) with a relay 125 which is supplied with a battery 126 grounded at 127, and the brush 69 being grounded by a conductor 128 through the switch 66 at 129, will cause energization of the relay 125 to actuate an armature and pawl and ratchet thereof to move a register 130 which will indicate that 11 feet of single tinsel ribbon conductor 10 have passed through the bridge. None of the lamps 91, 92, 93, etc., will be illuminated at the instant that the brush 69 contacts member 111 due to the fact that the brush 71 will be making contact with a blank contact member 89, but when the brushes 69, 70, and 71 are moved ahead one more contact so that the brush 71 is in engagement with a contact member 90 which connects with lamp 91, the lamp 91 will be illuminated to indicate that one foot over the 11 feet reading of the register 130 of single tinsel ribbon conductor 10 has passed through the bridge, and hence the one foot reading of the lamp 91 will be added to the 11 feet reading of the register 130 by the operator to total 12 feet of single tinsel ribbon conductor. The lamps 92, 93 and 94 will next be illuminated by the brush 71 and their readings will likewise be added by the operator to the 11 feet reading of the register 130 to total 13, 14, and 15 feet, respectively, of single tinsel ribbon conductor 10.

When the brush 69 has been forced farther on in the movement just described by the relay 64 to make contact with contact member 117, and the four contact members connected in common therewith for the purpose of furnishing a sufficient contact, a relay 134 supplied with current from a battery 135 grounded at 136 will be energized to attract an armature 137 which is connected with the winding of register relay 125, the armature 137 thus being made to engage a contact member 138 which connects by conductor 139 with contact member 142 and the four contact members connected in common therewith at the head of the contact row 75 and next to the blank end contact member 141 thereof. This energization of the relay 134 is accomplished for the purpose of completing a circuit from the contact member 142 to the register relay 125 so that the brush 69 will later actuate the relay 125 when the brush 69 contacts the member 142. While the relay 134 is now energized it also attracts an armature 145 thereof connected with a ground 146 by a conductor 147 and the push button switch 34 to ground the relay 134 through contact member 148 connected with the winding thereof to keep the relay 134 enlivened and attract the armature 137 while the brush 69 leaves the contact group 117 and passes over the blank contact member 141 to the contact member 142, it being remembered that the contact members are arranged in an endless circular direction. When the brush 69 reaches contact member 142 the brush 69 will ground and energize the register relay 125 through the conductor 139 and the armature 137 attracted by the relay 134 to actuate the register 130 to indicate 22 feet of single tinsel ribbon conductor 10 having passed through the bridge. However, at this time the brush 71 will illuminate the lamp 91 so that this lamp reading of one foot will have to be added to the 22 feet reading of register 130, making a total of 23 feet of single tinsel ribbon conductor, it being remembered that the reading of the lamps 91, 92, 93, etc., must always be added to the reading of the register 130. The brushes 69, 70, and 71 will now again move across the rows of contact members 75, 76, and 77 as long as the armature 42 of the bridge is attracted, lighting the lamps 92, 93, 94, etc., in succession, then actuating the register 130 to indicate 33 feet when the brush 69 comes into contact with the contact member 111, then lighting the lamps 91, 92, 93, etc., again which lamp readings are always added to the readings of the register 130. The relay 134 always remains energized after the brush 69 contacts the member 117 so that from now on each time the brush 69 contacts member 142 the register 130 will be actuated through a circuit completed through the attracted armature 137. Thus it is believed to be apparent how the brushes 69 and 71 of the selector 63 operate to record the total length of single tinsel ribbon conductor 10 which has passed through the Wheatstone bridge, the brushes 69 and 71 being set on the blank contact members as shown in the drawing to properly start the recording by depressing the switch 66 and making a ground connection through the brush 70, as described above.

The relay 51 provides for recording the number of portions of the conductor 10 having only a single tinsel ribbon 12 or 13, the total length of which portions are recorded in the manner just described by the selector 63. The relay 51 is provided with a battery 152 grounded at 153, and when the relay 51 is grounded, and thereby energized, by the armature 42 being attracted in the manner described above due to single tinsel ribbon conductor, armature 154, grounded at 155, is attracted into engagement with a contact member 156 which connects by a conductor 157 with the winding of relay 158. A battery 159 grounded at 160 is connected to the winding of the relay 158, so that when the grounded armature 154 is attracted as just mentioned the relay 158 becomes energized and actuates a pawl and ratchet of a register 161 which records that a single tinsel ribbon portion of the conductor 10 has passed through the bridge, and each time such a single tinsel ribbon portion appears in the bridge the register 161 records it to total such defective portions.

In order to record the length of the conductor 10 tested there is provided an interrupter 165 which is actuated through suitable gearing connected with the capstan 19. The interrupter 165 is provided with a ground connection through a conductor 166 which joins the conductor 52, which is grounded through conductor 56, and a relay 167 provided with a battery 168 grounded at 169 is connected by a conductor 170 with the interrupter 165. The interrupter 165, as soon as the capstan 19 starts drawing the conductor 10 through the test bridge, interruptedly grounds and thus intermittently energizes the relay 167, which relay actuates an armature and pawl and ratchet of a register 171 which records the number of feet of conductor 10 tested.

In order to record the number of knots or other undesirable enlargements in the cross section of the conductor 10 there is provided an insulated idler pulley 175 which makes contact with conductor 10 as it passes around the middle pulley 17, and when such cross section irregularities appear the pulley 175 is depressed and engages the armature 176 on which it is mounted with a contact member 177. A conductor 178 grounds the armature 176 by connection with the conductor 52, and the above mentioned engagement of the armature 176 with the contact member 177, thus grounds a relay 178 connected therewith through a conductor 179, thereby energizing the relay 178 which is provided with a battery 180 grounded at 181. A register 182 adjacent the relay 178 is then actuated through an attracted armature and pawl and ratchet to indicate that the knot or other enlargement in the conductor 10 has passed through the bridge, and in this manner the register 182 records the total number of such knots.

The capstan 19 and take-up reel 20 are driven through suitable connections (not shown) by motors 186 and 187, the motor 187 being series wound and having an extra series resistance 188 connected thereto to accentuate its series driving characteristic so that as the take-up reel 20 fills with the conductor 10 the pull thereof on the capstan 19 furnished by the motor 187 will continually be the same. The motors 186 and 187 are fed through a power supply switch 189 and two pairs of armatures of a relay 190 which is supplied with a battery 191 grounded at 192. In order to start the motors 186 and 187 a push button switch 193 is momentarily actuated to connect a ground 194 through a conductor 195 to a relay 196 which has a battery 199 and ground 200 connected thereto. The relay 196 then attracts an armature 201 which furnishes a locking ground for the relay 196, since the armature 201 is connected by a conductor 202 with a grounded armature 203 which is attracted by the relay 54 which is constantly energized during the test. The relay 196 attracts a grounded armature 204 which through a conductor 205 energizes the relay 190 to attract the two pairs of armatures thereof and thereby connect the motors 186 and 187, and thus the motors 186 and 187 are started and constantly kept going by simply momentarily depressing the switch 193. Should both of the tinsel ribbons 12 and 13 be missing at any time as the conductor 10 passes from the supply reel 14 to the pulley 16 the relay 54, being connected through that portion of the conductor 10, will be deenergized, allowing the grounded armature 203 to become retracted, thus disconnecting the relays 196 and 190 and thereby stopping the motors 186 and 187. Thus it is apparent how the absence of both tinsels 12 and 13 in the conductor 10 will completely stop the testing. A pair of resistances 206 are shunted around the armatures of relay 190 to permanently connect the motor 187 with its power supply so that this motor is continually driven to some extent although a completely defective conductor 10 having both tinsel ribbons missing breaks the circuit through relay 54 to stop the motors, and thus the motor 187 at all times maintains a small torque in the takeup reel 20 pulling on the conductor 10 in order to keep the portion of conductor 10 between the capstan 19 and take-up reel 20 always taut and from becoming entangled with itself. The motor 187 may of course be completely stopped by opening the supply switch 189.

In the operation of the above described apparatus the push button switch 33 is actuated and the annular groove 34 thereof, holds it down, which operation permanently enlivens the bridge consisting of the arms 24, 25, 26, and 27 by means of current supplied thereto through the conductor 30 from the battery 32. The relay 54 connected with the bridge is at the same time energized to attract the armature 55 thereof to connect the armature 42 with the ground connection 57 through the conductors 56 and 52, and the switch 34 also connects the conductor 147 with the ground connection 146. The motor starting switch 193 is now momentarily depressed, starting the motors 186 and 187 as aforedescribed to drive the capstan 19 and take-up reel 20, respectively, thereby drawing the conductor 10 from the supply reel 14 over the bridge pulleys 16, 17, and 18 and finally onto the take-up reel 20. When any portion of the conductor 10 passing over the bridge pulleys has only a single tinsel ribbon 12 or 13 the armature 42 is attracted, due to the unbalancing of the bridge, to ground and energize the relays 51 and 158 and actuate the register 161 which thus records each defective, single tinsel ribbon portion of the conductor 10 entering the bridge. The interrupter 165 driven by gears connected with the capstan 19 simultaneously continually energizes the register 171 to record the length of the conductor 10 tested. The selector 63, controlled by the bridge relay armature 42 and actuating the register 130 and illuminating the lamps 91, 92, 93, 94, etc. operates in the manner above described to measure the total length of single tinsel ribbon conductor 10 passed through the bridge, the selector first being set to the blank contact position shown in the drawing as described above, by depressing the push button switch 66. The register 182 is actuated each time a knot or similar enlargement in the conductor 10 passes the idler pulley 175 as before described. Thus, in summarizing the different recording features, the lamps 91, 92, 93, 94, etc. in connection with the register 130 record the total number of feet of single tinsel ribbon conductor tested, the register 161 records the total number of such single tinsel ribbon portions, the register 171 records the total number of feet of conductor tested, and the register 182 records the number of knots or surface obstructions in the conductor.

As described above should both of the tinsel ribbons 12 and 13 of the conductor 10 be missing as the conductor is drawn from the supply reel 14 the circuit through the relay 54 will be broken, and this will deenergize the relays 196 and 190, thus stopping the driving motors 186 and 187 to stop the advancement of the conductor 10, and at the same time the ground connection supplied each of the recording relays through the conductor 56 will be disconnected due to retracting of the armature 55. The testing apparatus is normally stopped by manually restoring the push button switch 33 so that the groove 34 no longer holds this switch depressed, which operation deenergizes the bridge and the relay 54, and thus disconnects the motors 186 and 187. Thus releasing the switch 33 also disconnects the grounds 146 and 57 serving all the recording relays to completely deenergize these relays.

From the foregoing description it is believed to be apparent that the invention provides an efficient and expeditious method of and apparatus for testing an electrical conductor, and although one specific embodiment of the invention has here been described, it will be understood that the invention is not limited thereto, but applies to the scope of the appended claims.

What is claimed is:

1. The method of testing a stranded conductor for missing strands, consisting in detecting missing strands in successive portions of the conductor by comparing the resistances thereof, and simultaneously recording the length of the missing strands.

2. The method of testing a composite conductor for defective portions, consisting in comparing the conductivity of successive portions of the conductor to detect defects therein, recording the number of defects, and simultaneously recording the extent of the defects.

3. In an apparatus for testing a stranded conductor for missing strands, means for detecting missing strands in successive portions of the conductor by comparing the resistances thereof, and means for simultaneously recording the length of the missing strands.

4. In an apparatus for testing a composite conductor for defective portions, means for comparing the conductivity of successive portions of the conductor to detect defects therein, means for recording the number of defects, and means for simultaneously recording the extent of the defects.

5. In an apparatus for testing a conductor for resistance defects, means for continuously moving the conductor, means for recording a resistance defect of a predetermined character, and means for stopping said moving means when a defect of another predetermined character is encountered.

6. In an apparatus for testing a conductor, means for comparing the conductivity of successive portions of the conductor, means for recording the extent of a variation in the conductivity, and means for initiating the operation of said recording means when a defect of a predetermined character is encountered.

7. In an apparatus for testing a conductor, means for moving the conductor relative to the apparatus, an impulsing device actuated by said means, and means for rendering said impulsing device effective to produce a manifestation of the character of a defect.

8. In an apparatus for testing a moving conductor, a bridge circuit including successive portions of the moving conductor, a relay responsive to an unbalance of the bridge circuit due to a variation of the conductivity of the conductor, and means for preventing a second actuation of the relay when a conductivity variation moves from one arm of the bridge to another arm of the bridge.

ARNE OXAAL.